United States Patent
Turski et al.

(10) Patent No.: US 7,472,006 B2
(45) Date of Patent: Dec. 30, 2008

(54) VEHICLE DYNAMICS CONTROL ARCHITECTURE

(75) Inventors: Michael P. Turski, Rochester Hills, MI (US); Matthew M. Karaba, Oxford, MI (US); Youssef A. Ghoneim, Torslanda (SE); Mark N. Howell, Rochester Hills, MI (US); David M. Sidlosky, Beverly Hills, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 478 days.

(21) Appl. No.: 11/230,377

(22) Filed: Sep. 20, 2005

(65) Prior Publication Data

US 2006/0064215 A1 Mar. 23, 2006

Related U.S. Application Data

(60) Provisional application No. 60/611,554, filed on Sep. 20, 2004.

(51) Int. Cl.
*B60K 23/00* (2006.01)
(52) U.S. Cl. .................... 701/41; 180/204

(58) Field of Classification Search .............. 701/1, 701/36, 37, 41, 38, 82, 90, 91, 213; 303/20; 280/5.503; 477/73, 75, 94; 180/204
See application file for complete search history.

(56) References Cited

U.S. PATENT DOCUMENTS

| | | | | |
|---|---|---|---|---|
| 4,998,593 | A * | 3/1991 | Karnopp et al. ............. | 180/408 |
| 5,351,776 | A * | 10/1994 | Keller et al. .................. | 701/70 |
| 6,865,459 | B2 * | 3/2005 | Harms et al. ................. | 701/36 |
| 7,158,869 | B2 * | 1/2007 | Vollmer et al. ............... | 701/36 |
| 7,263,419 | B2 * | 8/2007 | Wheals et al. ................ | 701/36 |
| 7,274,981 | B2 * | 9/2007 | Eriksson ..................... | 701/37 |
| 7,308,352 | B2 * | 12/2007 | Wang et al. .................. | 701/70 |

* cited by examiner

*Primary Examiner*—Dalena Tran

(57) ABSTRACT

A vehicle includes a plurality of sub-systems and corresponding controllers for effecting normal control thereover. The vehicle further includes a vehicle dynamics controller for providing high-priority sub-system commands for sub-system control to effect vehicle dynamics enhancements. The vehicle dynamics controller includes a plurality of independently decomposable and recomposable software components or layers and accessible inter-layer bus structure.

21 Claims, 4 Drawing Sheets

VEHICLE DYNAMICS CONTROL ARCHITECTURE

CROSS REFERENCE TO RELATED APPLICATION

This application claims the benefit of U.S. Provisional No. 60/611,554 filed Sep. 20, 2004, and which is hereby incorporated by reference in its entirety.

TECHNICAL FIELD

The present invention is generally related to vehicle dynamics control. More particularly, the invention relates to the vehicle dynamics control system architecture.

BACKGROUND OF THE INVENTION

Vehicle stability controls have progressed from first generation systems based upon braking and traction control (braking and powertrain torque management) technologies to more recent systems including independent and coordinated controls of brake, powertrain, steering and suspension damping sub-systems. Typically, distributed control modules are employed to directly interface with respective actuators to effect the desired sub-system controls. Coordination and authority of such sub-system control may be handled by way of a supervisory control.

Apart from the complexity and sophistication of vehicle stability controls, there is a high degree of integration and overlap of the affected vehicle sub-systems, most notably in the commonality of vehicle level parameters utilized across various sub-system controls for effecting the desired vehicle stability enhancements. Parametric commonality at the vehicle level suggests efficiency and other opportunities in processor utilization, communication bandwidth consumption, multi-platform application and flexibility of software. This may be even more acute in vehicle stability control systems which effect stability enhancement through a variety of distributed control modules associated with respective sub-system control (e.g. steering, braking, powertrain torque, suspension damping) wherein coordination and authority are handled through a central supervisory control.

Systematic reuse of software components promotes low-cost, quick-to-market and widely available vehicle systems. Significant benefits result directly from the application development cost, time, validation, maintainability and flexibility advantages afforded by such common software assets.

Therefore, it is desirable that a vehicle dynamics system be characterized by a high degree of software component availability and access to enable and promote reuse, maintainability, common validation and development, cost and time savings, and multi-platform utilization.

SUMMARY OF THE INVENTION

The present invention is a novel vehicle dynamics control system including at least one vehicle sub-system normally controlled in accordance with sub-system controls determined by at least one respective sub-system controller. The system further includes a vehicle dynamics controller for providing high priority sub-system commands for implementation by the at least one respective sub-system controller. The vehicle dynamics controller further includes multi-layer software components and inter-layer busses whereby decomposition and recomposition of selected ones of said multi-layer software components of the vehicle dynamics controller without affecting other ones of the multi-layer software components of said vehicle dynamics controller and access to selected ones of the inter-layer busses of the vehicle dynamics controller are enabled thereby.

These and other advantages and features of the invention will become apparent from the following description, claims and figures.

DESCRIPTION OF THE PREFERRED EMBODIMENT

Figure 1:
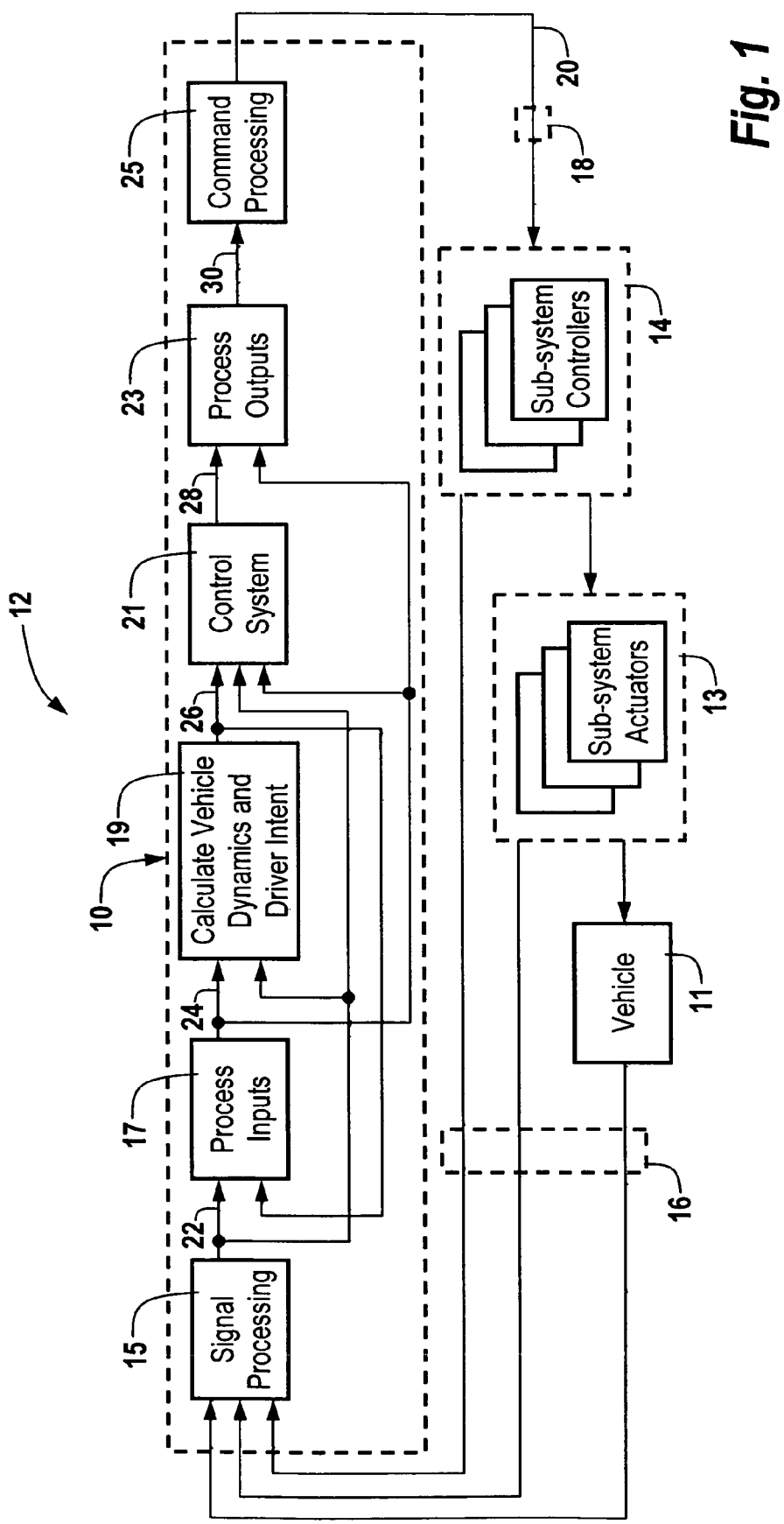
FIG. 1 is a schematic diagram of a vehicle including multiple sub-system dynamics control and control architecture in accordance with the present invention.

A vehicle dynamics control system 12 is schematically illustrated in FIG. 1 and includes vehicle 11 and vehicle dynamics controller 10. A plurality of actuators 13 associated with various vehicle sub-systems effect various forces upon vehicle 11 to enhance stability and maintain an intended path in response to such inputs as steering wheel angle, vehicle speed, wheel speed and vehicle yaw rate among others. For example, in an active front steering (AFS) system, the steering angle of the front vehicle wheels is affected by way of a steering actuator system that is commanded to effect the desired vehicle stability enhancement. In a braking/powertrain vehicle stability enhancement (VSE) system, individual wheel braking and powertrain torque may be affected by way of modulated hydraulic brake pressure and engine output torque control through a variety of techniques (e.g. spark timing, cylinder deactivation, engine fueling, etc.). In a semi-active suspension system, suspension damping characteristics may be altered in a manner to effect a desired vehicle stability enhancement. Other systems, including but not limited to active suspensions wherein spring rates are alterable, and active rear steering where rear wheel steering angle is alterable, are equally within the scope of application of the present invention.

Each such vehicle sub-system has associated therewith one or more control modules 14. Such sub-systems are operable in a distributed control fashion wherein each control unit associated with a particular sub-system is responsible for normal control functions thereof by commanding the control of the sub-system actuators 13. Such normal control functions generally are not related to vehicle dynamics control other than in a passive, contributory sense. For example, a powertrain controller is responsible for effecting an amount of output torque in response to an operator demand and for torque management during ratio shifting of a multi-speed ratio automatic transmission. The powertrain controller also normally performs emission critical and fuel economy critical functions which may implicate spark timing, cylinder deactivation, engine fueling, etc. A steering controller is responsible for variable assist—reducing steering effort during low speed and parking maneuvers and progressively increasing steering effort as vehicle speed increases. A four wheel steering control is also responsible for controlling the turn angle of the rear wheels in the opposite direction from the front wheels at low vehicle speeds and in the same direction at higher vehicle speeds. A suspension controller likewise is responsible for tuning the ride characteristics of the vehicle in accordance with vehicle speed, predominantly for operator comfort through reduced damping at low vehicle speeds and for improved highway feel through increased damping at higher vehicle speeds.

The vehicle 11, sub-system actuators 13 and sub-system controllers 14 all provide various input signals 16 to the vehicle dynamics controller 10 for use in vehicle dynamics control routines. Vehicle inputs may include, for example, yaw rate, lateral acceleration and vehicle speed. Actuator inputs may include, for example, damper position and road wheel angle. Sub-system controller inputs may include, for example, individual brake corner actuation override, brake system blending terms, shock damping value override, AFS steering actuator override or extra steering angle. Vehicle 11, sub-system actuators 13 and sub-system controllers 14 input signals are preferably provided over a controller area network (CAN) bus but may take the form of discrete sensor signal inputs, serial communication lines, etc. Vehicle dynamics controller 10 in turn provides high priority control commands 18 for overriding, modifying or adapting the normal control of the sub-system controllers 14 in the interest of implementing vehicle dynamics enhancing control of the various sub-system actuators 13.

Vehicle dynamics controller 10 includes a variety of structured processing layers adapted to effect desirable objectives of promoting re-use of the software components, application development time and cost reductions, maintainability and multiple vehicle platform adaptation, among others. Significantly, the present invention promotes the reusability of not only the large scale control application software components but also of the vehicular interfaces, signal conditioning, internal bus structures and output processing.

Beginning at the left of the vehicle dynamics controller 10 in FIG. 1, signal processing layer 15 is shown interfacing with the various input signals 16 from vehicle 11, sub-system actuators 13 and sub-system controllers 14. Signal processing layer 15 is communication coupled to process inputs layer 17 via internal sensor bus 22. Process inputs layer 17 is also communication coupled to vehicle dynamics/driver intent layer 19 via internal vehicle dynamics bus 26, both of which are described herein below. Process inputs layer 17 is in turn communication coupled to vehicle dynamics/driver intent layer 19 via internal input bus 24. Vehicle dynamics/driver intent layer 19 is also communication coupled to signal processing layer 15 via internal sensor bus 22. Vehicle dynamics/driver intent layer 19 is in turn communication coupled to control system layer 21 via internal vehicle dynamics bus 26. Control system layer 21 is also communication coupled to signal processing layer 15 via internal sensor bus 22 and to process inputs layer 17 via internal input bus 24. Control system layer 21 is in turn communication coupled to process outputs layer 23 via internal control bus 28. Process outputs layer 23 is also communication coupled to process inputs layer 17 via internal input bus 24. Process outputs layer 23 is in turn communication coupled to command processing layer 25 via internal output bus 30. Finally, command processing layer 25 is in turn communication coupled to the various sub-system controllers 14 via CAN bus 20 to provide the previously described control commands 18.

From the preceding description of the vehicle dynamics controller 10, it can be appreciated that the described layers provides software partitioning, including at the vehicle interfacing, signal conditioning, internal bus structures and output processing to provide the aforementioned advantages. The layer independence allows for desired modularity and decomposition/recomposition of one or more layers or software components for development and maintenance without substantial effect upon any remaining layers or software components. The inter-layer bussing provides desired access to varying levels of input and output signals useful in development (e.g. for debugging and instrumentation) and sophisticated utilization of varying degrees of refined data both within and outside of the vehicle dynamics controller. The availability of gross-level decomposition of the vehicle dynamics controller of FIG. 10, and of structured inter-layer access via the internal bus thus architected, enables and promotes the objectives of software component re-use, application development time and cost reductions, maintainability and multiple vehicle platform adaptation.

Additional detail with respect to the various layers and inter-layer communication of vehicle dynamics controller 10 thus described in reference to FIG. 1 will be set forth with additional reference now to the remaining FIGS. 2-6.

Figure 2:
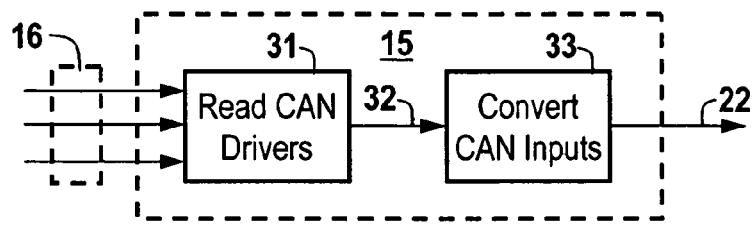
FIG. 2 is a schematic diagram of the input processing layer of the multiple sub-system dynamics control architecture illustrated in FIG. 1 in accordance with the present invention.

Beginning with FIG. 2, signal processing layer 15 includes functional block 31 for reading CAN based signals, from sensors or derivations, including from vehicle 11, actuators 13 and sub-system controllers 14. Block 31 is communication coupled to CAN input conversion functional block 33 via internal receive CAN bus 32. Blocks 31 and 33 read the signals in, ensuring accuracy and robustness through appropriate level diagnostics, and convert the CAN signals to engineering units raw inputs for use in subsequent layers. Block 33 is communication coupled to internal sensor bus 22 for communicating the inputs with process inputs layer 17, vehicle dynamics/driver intent layer 19 and control system layer 21.

Figure 3:
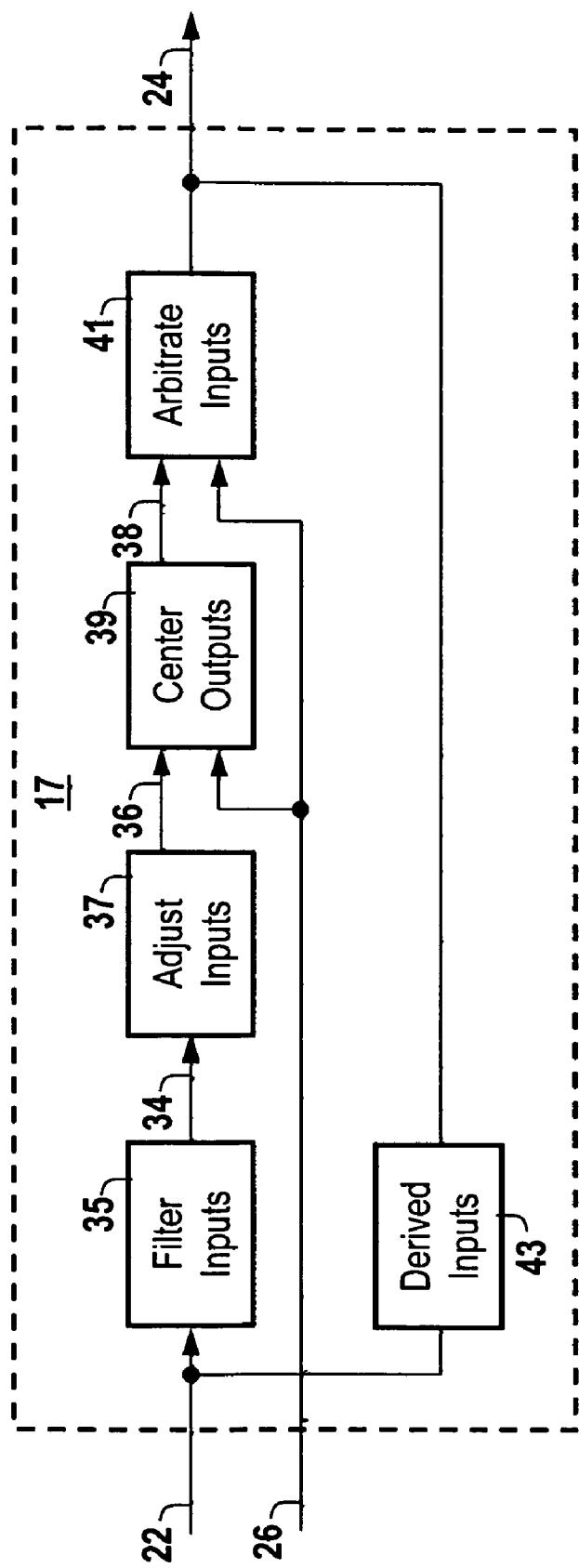
FIG. 3 is a schematic diagram of the process input layer of the multiple sub-system dynamics control architecture illustrated in FIG. 1 in accordance with the present invention.

FIG. 3 illustrates process inputs layer 17 in additional detail including functional block 35 for filtering the inputs on internal sensor bus 22, thus centralizing input filtering to a common software component. From block 35, via internal filtered inputs bus 34, the filtered inputs are provided to functional block 37 for adjusting the inputs—for example, center of gravity adjustments to sensed motion for an offset motion sensor placement. From block 37, via internal adjusted inputs bus 36, the adjusted inputs are provided to functional block 39 for centering the inputs—for example, removal of sensor biases. Centering functionality is also performed for data provided over vehicle dynamics bus 26. From block 39, via internal centered inputs bus 38, the centered inputs are provided to functional block 41 for arbitration of multiple (i.e. redundant) related inputs providing, for example, validity determination, sanity checks for such things as input magnitude and ultimately determination of a single valid input from the multiplicity of related inputs. Arbitration functionality is also performed for data provided over vehicle dynamics bus 26. Functional block 43 is provided for derivation of additional inputs from inputs on internal sensor bus 22—for example first order derivative operations to provide vehicle yaw acceleration from vehicle yaw rate input. From functional blocks 43 and 41, such derived and arbitrated inputs, respectively, are communication coupled to internal inputs bus 24 for communicating the inputs with vehicle dynamics/ driver intent layer 19, control system layer 21 and process outputs layer 23.

Figure 4:
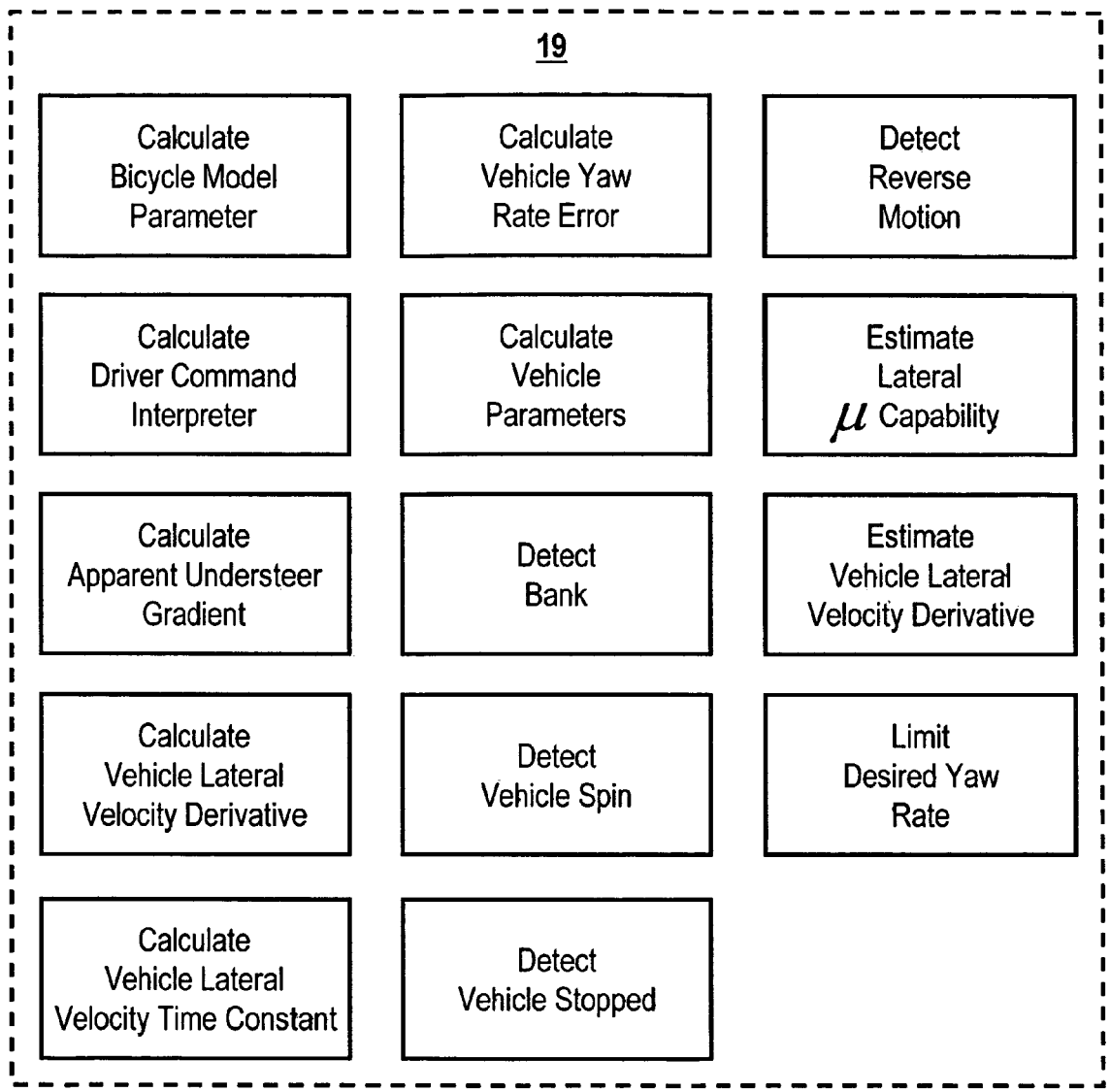
FIG. 4 is a schematic diagram of the vehicle dynamics and driver intent calculation layer of the multiple sub-system dynamics control architecture illustrated in FIG. 1 in accordance with the present invention.

FIG. 4 illustrates vehicle dynamics/driver intent layer 19 in additional detail including a plurality of exemplary functional blocks for determining a variety of parameters required by the control system layer 21 of the vehicle dynamics controller 10 in determining the desirability of, and executory commands for, implementing active vehicle dynamics control. The functional blocks illustrated are, of course, non-exhaustive examples of various parameter determinations including: modeling functions; and calculated, detected, estimated, predicted or otherwise determined rates, limits, capabilities, conditions, quantities, errors and states. As best illustrated in FIG. 1, vehicle dynamics/driver intent layer 19 receives inputs and signals from internal inputs bus 24 and internal sensor bus 22, respectively, and provides parameter inputs to control system layer 21 via internal vehicle dynamics bus 26.

Figure 5:
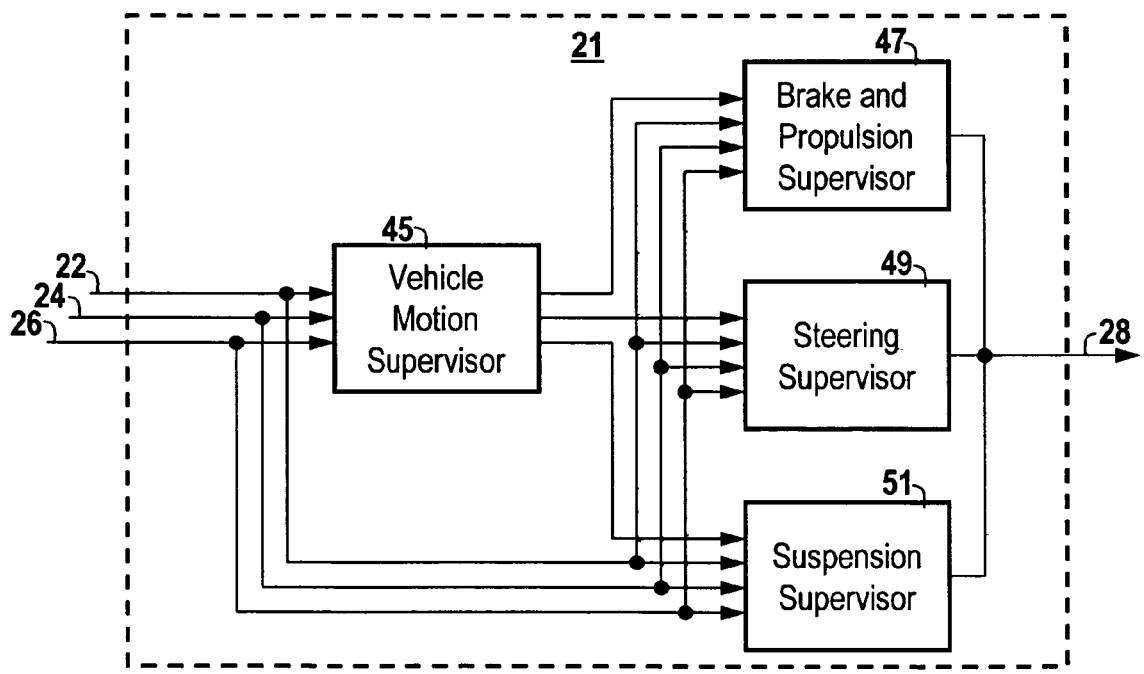
FIG. 5 is a schematic diagram of the control system of the multiple sub-system dynamics control architecture illustrated in FIG. 1 in accordance with the present invention.

FIG. 5 illustrates control system layer 21 in additional detail including dual-layer supervisory control aspects of the control system layer 21 of the vehicle dynamics controller 10. Vehicle motion supervisor 45 receives raw inputs from signal processing layer 15 via internal sensor bus 22, derived and arbitrated inputs from process inputs layer 17 via internal inputs bus 24, and parameter inputs from vehicle dynamics/ driver intent layer 19 via internal vehicle dynamics bus 26. Vehicle motion supervisor 45 is communication coupled to brake and propulsion supervisor 47, steering supervisor 49 and suspension supervisor 51 and oversees the coordination of the various vehicle dynamics control sub-system supervisors 47, 49 and 51. Each of these vehicle dynamics control sub-system supervisors also receives raw inputs from signal processing layer 15 via internal sensor bus 22, derived and arbitrated inputs from process inputs layer 17 via internal inputs bus 24, and parameter inputs from vehicle dynamics/ driver intent layer 19 via internal vehicle dynamics bus 26. The vehicle dynamics control sub-system supervisors 47, 49 and 51 are coordinated by the vehicle motion supervisor 45 and provide respective high priority control command inputs to process outputs layer 23 via internal control bus 28, ultimately for overriding, modifying or adapting the normal control of the sub-system controllers 14 in the interest of implementing vehicle dynamics enhancing control of the various sub-system actuators 13.

Process outputs layer 23 receives high priority control command inputs from control system layer 21 via internal control bus 28, and derived and arbitrated inputs from process inputs layer 17 via internal inputs bus 24. Process outputs layer 23 provides command inputs and derived and arbitrated inputs to command processing layer 25 via internal output bus 30. Additionally, the command inputs and derived and arbitrated inputs may be accessed via output bus 30 for instrumentation purposes during development including software debugging and experimentation purposes.

Figure 6:
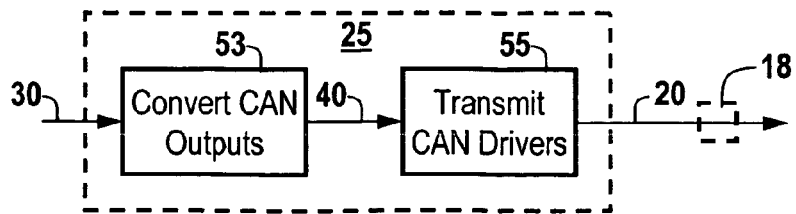
FIG. 6 is a schematic diagram of the command processing layer of the multiple sub-system dynamics control architecture illustrated in FIG. 1 in accordance with the present invention.

FIG. 6 illustrates command processing layer 25 in additional detail including command conversion and transmission functionality of the vehicle dynamics controller 10. Command processing layer 25 includes functional block 53 for converting the engineering units of the inputs into CAN signals appropriate for transmission across a CAN bus. Additionally, check sums and rolling counts for diagnostic purposes are calculated in functional block 53 of the command processing layer 25. Block 53 is communication coupled to transmit CAN drivers functional block 55 via internal transmit CAN bus 40. Block 55 manages the communication of high priority control commands 18 for overriding, modifying or adapting the normal control of the sub-system controllers 14 in the interest of implementing vehicle dynamics enhancing control of the various sub-system actuators 13.

The invention has been described with respect to certain exemplary embodiments. However, it is to be understood that various modifications and alternative implementations of the invention without departing from the scope of the invention as defined in the following claims.

The invention claimed is:

1. Vehicle dynamics control system architecture comprising:
   at least one vehicle sub-system normally controlled in accordance with sub-system controls determined by at least one respective sub-system controller; and
   a vehicle dynamics controller for providing high priority sub-system commands for implementation by said at least one respective sub-system controller, said vehicle dynamics controller including multi-layer software components and inter-layer busses wherein selected ones of said multi-layer software components can be decomposed and recomposed independently from other ones of said multi-layer software components and said inter-layer busses provide access to respective inputs and outputs of said multi-layer software components.

2. A vehicle dynamics control system architecture as claimed in claim 1 wherein one of said multi-layer software components comprises a control system component for determining and providing said high priority sub-system commands.

3. A vehicle dynamics control system architecture as claimed in claim 2 wherein said control system component comprises dual-layer supervisory control including a vehicle motion supervisor component and a plurality of vehicle dynamics control sub-system supervisor components wherein said vehicle motion supervisor component adapted to coordinate said plurality of vehicle dynamics control sub-system supervisor components.

4. A vehicle dynamics control system architecture as claimed in claim 1 wherein one of said multi-layer software components comprises a vehicle dynamics/driver intent component for determining parameters used in determining high priority sub-system commands.

5. A vehicle dynamics control system architecture as claimed in claim 4 wherein one of said multi-layer software components comprises a control system component for determining and providing said high priority sub-system commands.

6. A vehicle dynamics control system architecture as claimed in claim 5 wherein said control system component comprises dual-layer supervisory control including a vehicle motion supervisor component and a plurality of vehicle dynamics control sub-system supervisor components wherein said vehicle motion supervisor component adapted to coordinate said plurality of vehicle dynamics control sub-system supervisor components.

7. Vehicle dynamics control system architecture comprising:
   a vehicle dynamics controller including multi-layer software components communicatively coupled via an inter-layer bus structure, said multi-layer software components including an independently decomposable control system layer for providing high priority sub-system commands relating to vehicle dynamics control; and
   a vehicle sub-system including a sub-system controller and actuators, said actuators normally controlled in accordance with sub-system control functions effected by sub-system controller routines that are generally not related to vehicle dynamics control, said subsystem controller further being adapted to implement said high priority sub-system commands to effect vehicle dynamics enhancing control of the actuators.

8. A vehicle dynamics control system architecture as claimed in claim 7 wherein said control system component comprises dual-layer supervisory control including a vehicle motion supervisor component and a plurality of vehicle dynamics control sub-system supervisor components wherein said vehicle motion supervisor component adapted to coordinate said plurality of vehicle dynamics control sub-system supervisor components.

9. A vehicle dynamics control system architecture as claimed in claim 7 wherein said vehicle subsystem comprises wheel torque control.

10. A vehicle dynamics control system architecture as claimed in claim 9 wherein said wheel torque control comprises wheel brake control.

11. A vehicle dynamics control system architecture as claimed in claim 9 wherein said wheel torque control comprises engine output torque control.

12. A vehicle dynamics control system architecture as claimed in claim 7 wherein said vehicle subsystem comprises wheel angle control.

13. A vehicle dynamics control system architecture as claimed in claim 12 wherein said wheel angle control comprises front steering control.

14. A vehicle dynamics control system architecture as claimed in claim 7 wherein said wheel angle control comprises rear steering control.

15. A vehicle dynamics control system architecture as claimed in claim 14 wherein said suspension control comprises semi-active suspension control.

16. A vehicle dynamics control system architecture as claimed in claim 14 wherein said suspension control comprises active suspension control.

17. A vehicle dynamics control system architecture as claimed in claim 7 wherein said wheel angle control comprises rear steering control.

18. Vehicle dynamics control system architecture comprising:
 a vehicle dynamics controller for providing high priority sub-system commands relating to vehicle dynamics control, said vehicle dynamics controller including a plurality of independently decomposable layered software components communicatively coupled via an inter-layer bus structure, said layered software components including
 a vehicle dynamics/driver intent component for determining parameters used in determining vehicle dynamics control commands from respective inputs thereto,
 a control system component for determining and providing high priority vehicle dynamics control commands from respective inputs thereto,
 a vehicle sub-system including a sub-system controller and actuators, said actuators normally controlled in accordance with sub-system control functions effected by sub-system controller routines that are generally not related to vehicle dynamics control, said subsystem controller further being adapted to receive and implement said high priority vehicle dynamics control commands to effect vehicle dynamics enhancing control of the actuators.

19. A vehicle dynamics control system architecture as claimed in claim 18 wherein said layered software components further comprise:
 a signal processing component for reading, diagnosing and converting input signals provided to the vehicle dynamics controller,
 a process inputs component for filtering, adjusting, centering, and arbitrating respective inputs thereto,
 a process outputs component, and
 a command processing component for converting and diagnosing respective inputs thereto and for transmitting high priority vehicle dynamics control commands.

20. A vehicle dynamics control system architecture as claimed in claim 18 wherein said control system component comprises dual-layer supervisory control including a vehicle motion supervisor component and a plurality of vehicle dynamics control sub-system supervisor components wherein said vehicle motion supervisor component adapted to coordinate said plurality of vehicle dynamics control sub-system supervisor components.

21. A vehicle dynamics control system architecture as claimed in claim 19 wherein said control system component comprises dual-layer supervisory control including a vehicle motion supervisor component and a plurality of vehicle dynamics control sub-system supervisor components wherein said vehicle motion supervisor component adapted to coordinate said plurality of vehicle dynamics control sub-system supervisor components.

* * * * *